United States Patent
Huang (10) Patent No.: US 11,036,316 B2
(45) Date of Patent: Jun. 15, 2021

(54) TOUCH MODULE (71) Applicant: PRIMAX ELECTRONICS LTD., Taipei (TW)

(72) Inventor: Tai-Sou Huang, Taipei (TW)

(73) Assignee: PRIMAX ELECTRONICS LTD., Taipei (TW)

(*) Notice: Subject to any disclaimer, the term of this patent is extended or adjusted under 35 U.S.C. 154(b) by 0 days.

(21) Appl. No.: 16/659,857

(22) Filed: Oct. 22, 2019

(65) Prior Publication Data
US 2021/0064155 A1 Mar. 4, 2021

(30) Foreign Application Priority Data
Aug. 30, 2019 (TW) ................... 108131385

(51) Int. Cl.
G06F 3/0354 (2013.01)
G06F 3/02 (2006.01)
G06F 1/16 (2006.01)
G06F 3/038 (2013.01)

(52) U.S. Cl.
CPC ........ G06F 3/03547 (2013.01); G06F 1/1671 (2013.01); G06F 3/02 (2013.01); G06F 3/038 (2013.01); G06F 1/1616 (2013.01)

(58) Field of Classification Search
CPC .......... G06F 3/03547; G06F 3/02; G06F 3/38; G06F 3/0213; G06F 3/04886; G06F 1/1671; G06F 1/1667; G06F 1/1679; G06F 1/169; G06F 1/1616; G06F 2200/1634
See application file for complete search history.

(56) References Cited

U.S. PATENT DOCUMENTS

| | | | | |
|---|---|---|---|---|
| 5,793,355 A * | 8/1998 | Youens | ................... | G06F 1/169 345/156 |
| 6,035,214 A * | 3/2000 | Henderson | ............ | G06F 1/1616 345/905 |
| 6,388,660 B1 * | 5/2002 | Manser | ................. | G06F 1/1616 345/173 |
| 6,429,847 B1 * | 8/2002 | Johnson | ................ | G06F 1/1616 345/157 |
| 8,537,541 B2 * | 9/2013 | Zhang | ..................... | G06F 1/169 361/679.55 |
| 8,693,179 B2 * | 4/2014 | Wei | ......................... | G06F 1/169 361/679.18 |
| 9,229,538 B2 * | 1/2016 | Kao | ...................... | G06F 3/0338 |
| 2006/0250377 A1 * | 11/2006 | Zadesky | ................. | G06F 3/045 345/173 |

(Continued)

Primary Examiner — Christopher E Leiby
(74) Attorney, Agent, or Firm — WPAT, PC (57) ABSTRACT A touch module for an electronic device includes a casing, a touch structure and at least one stopping pin. The casing includes an accommodation structure. The accommodation structure is formed on a bottom surface of the casing. The accommodation structure includes an opening. A of the touch structure touchpad is installed in the accommodation structure. There is a horizontal gap between a lateral edge of the touchpad and an inner wall of the accommodation structure. The stopping pin is fixed on the bottom surface of the casing and aligned with a vertical gap of the touch structure. While the touch structure is moved in a first direction or a second direction through the at least one horizontal gap, the stopping pin is inserted into the vertical gap or detached from the vertical gap.

12 Claims, 7 Drawing Sheets (56) References Cited

U.S. PATENT DOCUMENTS

2011/0141052 A1* 6/2011 Bernstein .............. G09G 5/006
 345/174
2016/0026268 A1* 1/2016 Chassot ............. G06F 3/03547
 345/158

* cited by examiner

TOUCH MODULE

FIELD OF THE INVENTION

The present invention relates to an input module, and more particularly to a touch module for an electronic device.

BACKGROUND OF THE INVENTION

A touchpad is an input module that allows the user's finger to press or slide on a smooth panel to operate of the electronic device. Since the touchpad is very thin, the touchpad is usually applied to a notebook computer, a smart phone, a personal digital assistant (PDA) or any other appropriate electronic device.

Generally, the touch function of the touchpad can move a cursor or control the windows, and achieve the functions as the left and right buttons of a mouse. With increasing development of science and technology, the touchpad can be operated in various function modes (e.g., a calculator mode or a quick function mode). According to the existing technology, a switching key is installed on the electronic device or the touchpad. For switching the function mode of the touchpad, it is necessary to press down the switching key. If the switching key is installed on the touchpad, some drawbacks possibly occur. For example, when the user operates the touchpad in a different function mode, the user may erroneously touch the switching key or press down the touchpad to generate an erroneous pressing signal. Under this circumstance, the operation of the function mode is interrupted. In other words, the conventional touchpad is not user-friendly.

For overcoming the drawbacks of the conventional technologies, there is a need of providing a touch module that is capable of avoiding erroneous operation and instantly switching a function mode interface.

SUMMARY OF THE INVENTION

The present invention provides a touch module capable of instantly switching a function mode interface in order to prevent from erroneously switching the function mode.

In accordance with an aspect of the present invention, a touch module for an electronic device is provided. The touch module includes a casing, a touch structure and at least one stopping pin. The casing includes an accommodation structure. The accommodation structure is formed on a bottom surface of the casing. The accommodation structure includes an opening. The touch structure includes a touchpad, a supporting plate and a connection seat. The touchpad is installed in the accommodation structure. There is at least one horizontal gap between a lateral edge of the touchpad and an inner wall of the accommodation structure. The supporting plate is movably installed on the bottom surface of the casing. The connection seat is arranged between the touchpad and the supporting plate. The touchpad and the supporting plate are combined together through the connection seat. There is a vertical gap between the touchpad and the supporting plate through the connection seat. Each of the at least one stopping pin includes a first end part and a second end part, which are opposed to each other. The first end part is fixed on the bottom surface of the casing. The second end part is aligned with the vertical gap. While the touch structure is moved in a first direction or a second direction through the at least one horizontal gap, the second end part of the stopping pin is inserted into the vertical gap or detached from the vertical gap. The first direction and the second direction are opposite.

In an embodiment, the accommodation structure further includes a first installation part and a second installation part. The first installation part is installed on a first lateral wall of the accommodation structure corresponding to the at least one horizontal gap. The second installation part is installed on a second lateral wall of the accommodation structure. The first installation part includes two first protrusion posts. The second installation part includes two second protrusion posts.

In an embodiment, a first edge of the supporting plate includes two first elongated slots corresponding to the two first protrusion posts, and a second edge of the supporting plate includes two second elongated slots corresponding to the two second protrusion posts.

In an embodiment, the touch module further includes four position-limiting elements. After the four position-limiting elements are respectively penetrated through the corresponding first elongated slots and the corresponding second elongated slots and connected with the corresponding first protrusion posts and the corresponding second protrusion posts, the supporting plate is movable along length directions of the first elongated slots and the second elongated slots.

In an embodiment, each of the position-limiting elements includes a head part and a body part. An end of the body part away from the head part is penetrated through the corresponding elongated slot of the first elongated slots and the second elongated slots and connected with the corresponding protrusion post of the first protrusion posts and the second protrusion posts. The supporting plate is contacted with the head part.

In an embodiment, the first end part of the stopping pin is fixed between the two first protrusion posts of the first installation part, and the second end part of the stopping pin is located under the at least one horizontal gap.

In an embodiment, the touch structure further includes at least one mode-adjusting switch. The at least one mode-adjusting switch is disposed on the bottom surface of the touchpad and located beside the first installation part.

In an embodiment, when the second end part of the stopping pin is inserted into the vertical gap, the at least one mode-switching element is pressed by the first installation part. Consequently, at least one function mode interface is enabled.

In an embodiment, the at least one function mode interface includes a numeric function mode interface or a quick function mode interface.

In an embodiment, the touchpad includes a covering plate, a backlight display layer and a circuit board, which are arranged in a stack form from top to bottom. The covering plate is partially exposed to the opening. The backlight display layer is permitted to display the at least one function mode interface on a surface of the covering plate.

In an embodiment, a pressing switch is disposed on a bottom surface of the touchpad, and the pressing switch is located beside a side of the touchpad away from the connection seat.

In an embodiment, when the second end part of the stopping pin is detached from the vertical gap, the touchpad is permitted to be swung in the vertical gap by using the connection seat as a fulcrum. When the touchpad is swung and the pressing switch is contacted with the supporting plate, a corresponding pressing signal is generated.

In an embodiment, the supporting plate includes a pressing block corresponding to the pressing switch.

In an embodiment, the accommodation structure further includes at least one switching perforation, and the at least one switching perforation is located at a lateral wall of the accommodation structure and arranged near an edge of the casing.

In an embodiment, the touch structure further includes a switching element, and the switching element includes a fixed part and at least one operation part. The at least one operation part is connected with the fixed part. The fixed part is fixed on a bottom surface of the touchpad. The at least one operation part is partially exposed outside the at least one switching perforation.

In an embodiment, while the touchpad is moved with the at least one operation part, the touchpad is moved within the accommodation structure through the at least one horizontal gap.

In an embodiment, the electronic device is a notebook computer, a keyboard, a smart phone, a personal digital assistant, a writing tablet or a graphics tablet.

From the above descriptions, the touch module of the present invention is advantageous over the conventional technology. By moving the touch structure of the touch module, the function mode interface of the touchpad can be switched quickly and the problem of erroneously switching the function mode can be avoided.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
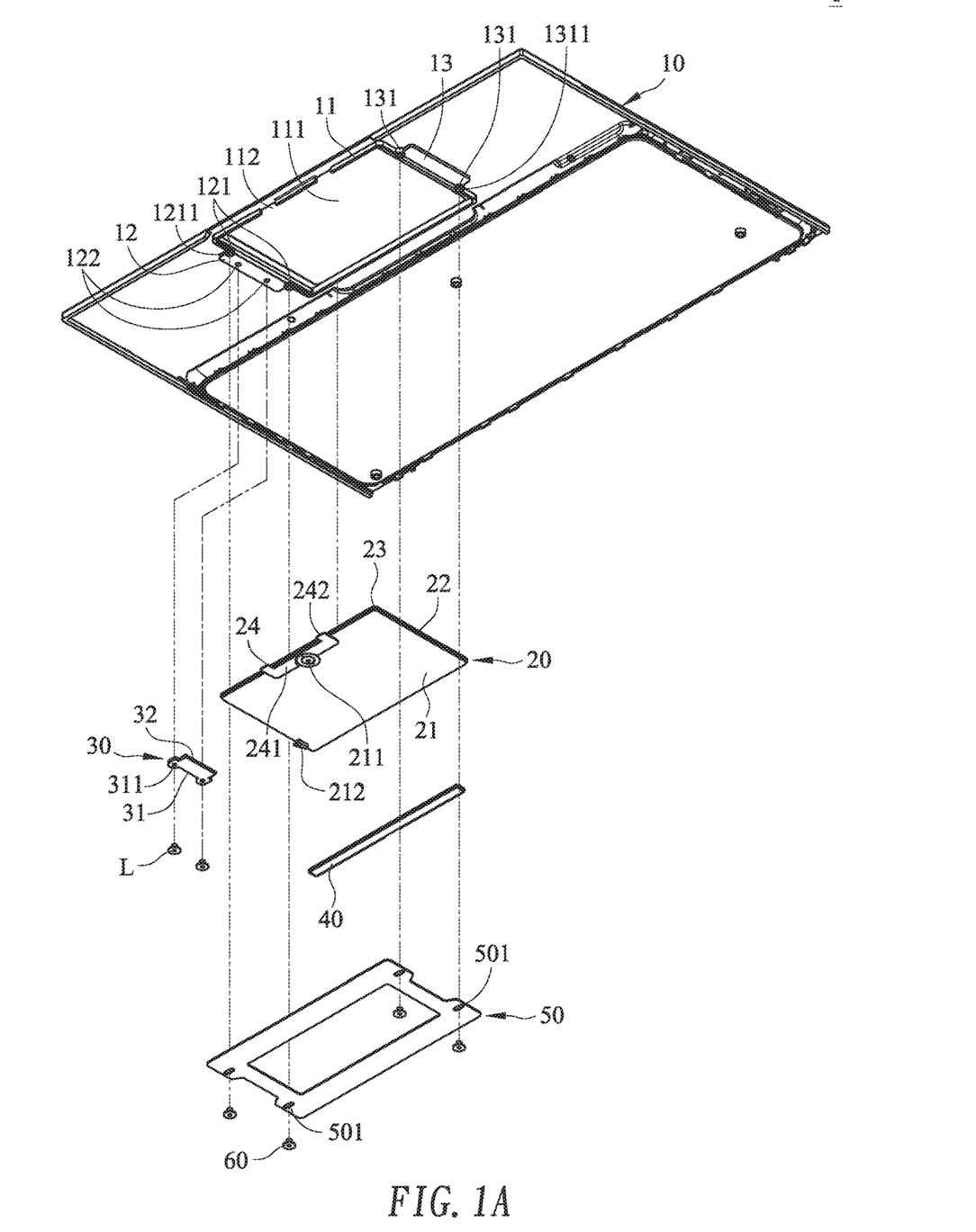
FIG. 1A is a schematic exploded view illustrating a touch module according to an embodiment of the present invention and taken along a first viewpoint.
Figure 1B:
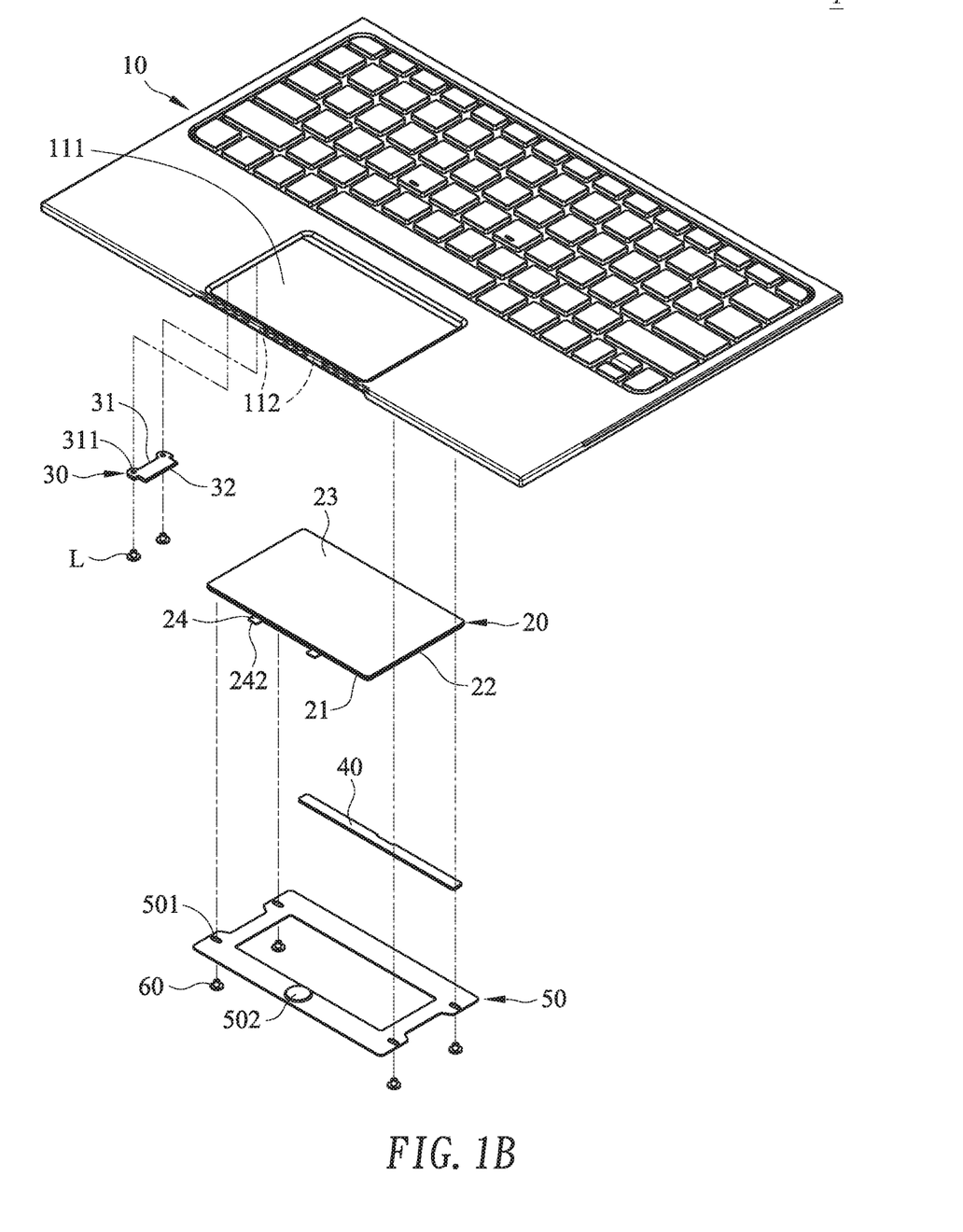
FIG. 1B is a schematic exploded view illustrating the touch module according to the embodiment of the present invention and taken along a second viewpoint.

Please refer to FIGS. 1A and 1B. FIG. 1A is a schematic exploded view illustrating a touch module according to an embodiment of the present invention and taken along a first viewpoint. FIG. 1B is a schematic exploded view illustrating the touch module according to the embodiment of the present invention and taken along a second viewpoint. The touch module 1 is applied to an electronic device. An example of the electronic device includes but is not limited to a notebook computer, a keyboard, a smart phone, a personal digital assistant (PDA), a writing tablet or a graphics tablet. In an embodiment, the touch module 1 comprises a casing 10, a touchpad 20, at least one stopping pin 30, a connection seat 40, a supporting plate 50 and plural position-limiting elements 60.

The casing 10 is a portion or the entire of a casing of the electronic device. In this embodiment, the casing 10 is a portion of a keyboard casing of a notebook computer. Moreover, plural keys are installed on a top surface of the casing 10. An accommodation structure 11 is formed on the bottom surface of the casing 10. The accommodation structure 11 comprises an opening 111 and one or plural switching perforations 112. The opening 111 runs through the top surface and the bottom surface of the casing 10. The one or plural switching perforations 112 are located at a lateral wall of the accommodation structure 11 and arranged near an edge of the casing 10. The accommodation structure 11 further comprises a first installation part 12 and a second installation part 13. The first installation part 12 and the second installation part 13 are respectively installed on two opposite lateral walls of the accommodation structure 11 which are perpendicular to the edge of the casing 10. The first installation part 12 comprises two protrusion posts 121 at two opposite sides. The second installation part 13 comprises two protrusion posts 131 at two opposite sides. The first installation part 12 further comprises two first fastening holes 122, which are arranged between the two protrusion posts 121. Each of the protrusion posts 121 and protrusion posts 131 comprises a second fastening hole 1211 (or 1311).

The orthographic projection area of the touchpad 20 is smaller than the orthographic projection area of the accommodation structure 11. From top to bottom, the touchpad 20 comprises a covering plate 23, a backlight display layer 22 and a circuit board 21, which are arranged in a stack form. The touchpad 20 is installed in the accommodation structure 11. The covering plate 23 is partially exposed to the opening 111. The user's finger can press or slide on the covering plate 23. In this embodiment, the covering plate 23 is made of ceramic material or glass material. Alternatively, the covering plate 23 is made of sapphire crystal. The backlight display layer 22 is used for displaying one or plural function mode interfaces on the surface of the covering plate 23. Moreover, a pressing switch 211 and a mode-adjusting switch 212 are disposed on a bottom surface of the circuit board 21. The mode-switching element 212 is disposed on a bottom surface of the circuit board 21 and located beside the first installation part 12. When the pressing switch 211 is triggered, a pressing signal is generated. When the mode-adjusting switch 212 is triggered, a corresponding function mode interface of the touchpad 20 is enabled. In an embodiment, a switching element 24 is disposed on the bottom surface of the touchpad 20. The switching element 24 comprises a fixed part 241 and one or plural operation parts 242. The fixed part 241 and the operation parts 242 are connected with each other. The fixed part 241 is fixed on the bottom surface of the circuit board 21 and located beside the pressing switch 211. The one or plural operation parts 242 are penetrated through one or plural switching perforations 112, which are located at the lateral wall of the accommodation structure 11.

The stopping pin 30 comprises a first end part 31 and a second end part 32, which are opposed to each other. In this embodiment, the first end part 31 of the stopping pin 30 comprises two locking holes 311 corresponding to the two first fastening holes 122 of the first installation part 12. After fastening elements L (e.g., screws) are penetrated through the corresponding locking holes 311 and the corresponding first fastening holes 122 sequentially and tightened into the corresponding first fastening holes 122, the stopping pin 30 is fixed on the first installation part 12.

The connection seat 40 is arranged between the touchpad 20 and the supporting plate 50. The touchpad 20 and the supporting plate 50 are combined together by the connection seat 40 through an adhering means or a welding means. The supporting plate 50 has a first edge and a second edge. Each of the first edge and the second edge of the supporting plate 50 comprises two elongated slots 501. Moreover, the top surface of the supporting plate 50 is provided with a pressing block 502 corresponding to the pressing switch 211. The elongated slots 501 are aligned with the corresponding protrusion posts 121 and the corresponding protrusion posts 131. After the position-limiting elements 60 are penetrated through the corresponding elongated slots 501 and tightened into the second fastening holes 1211 of the corresponding protrusion posts 121 and the second fastening holes 1311 of the corresponding protrusion posts 131. Consequently, the supporting plate 50 is movable along the length directions of the elongated slots 501.

Figure 2A:
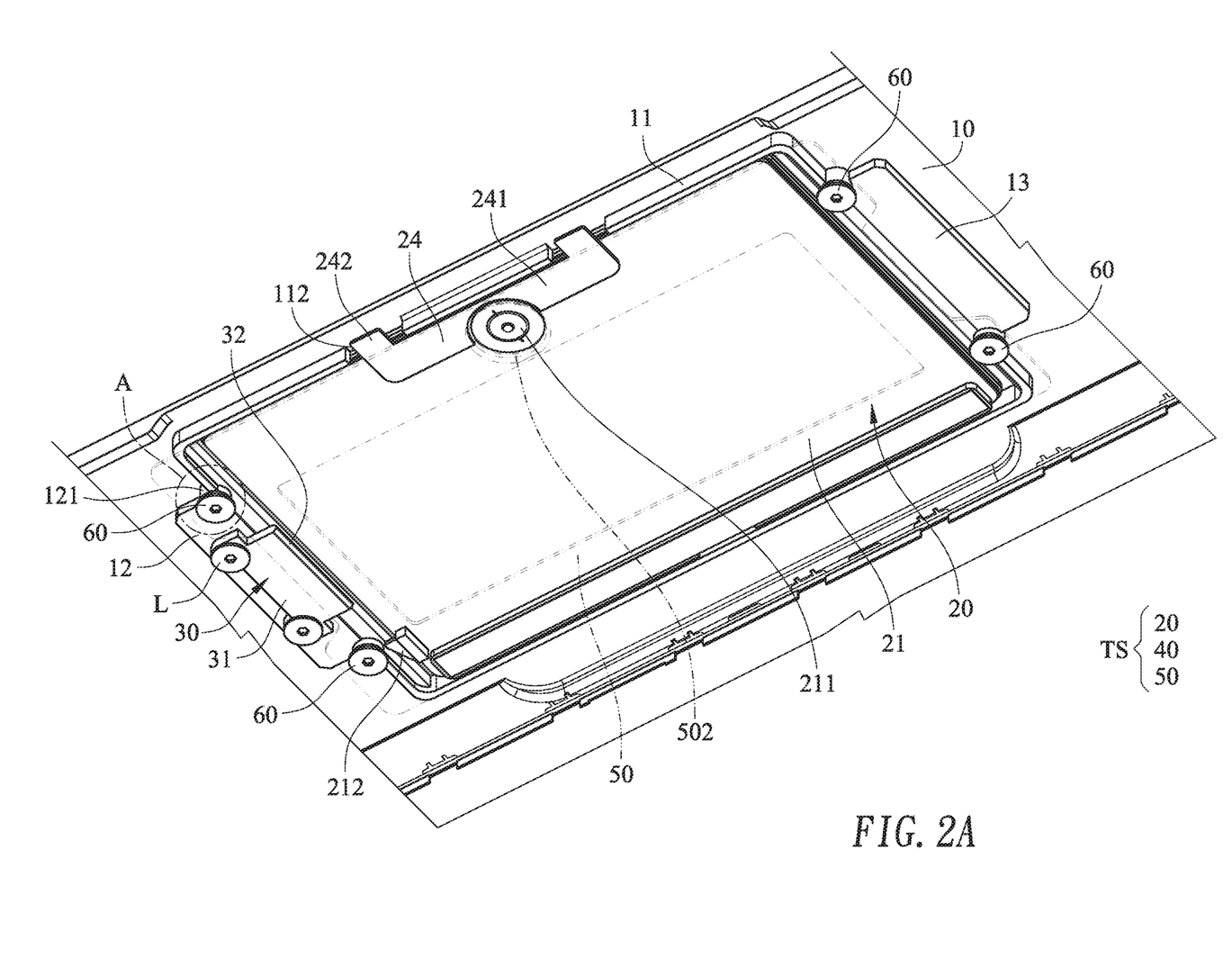
FIG. 2A is a schematic bottom view illustrating the touch module according to the embodiment of the present invention.
Figure 2B:
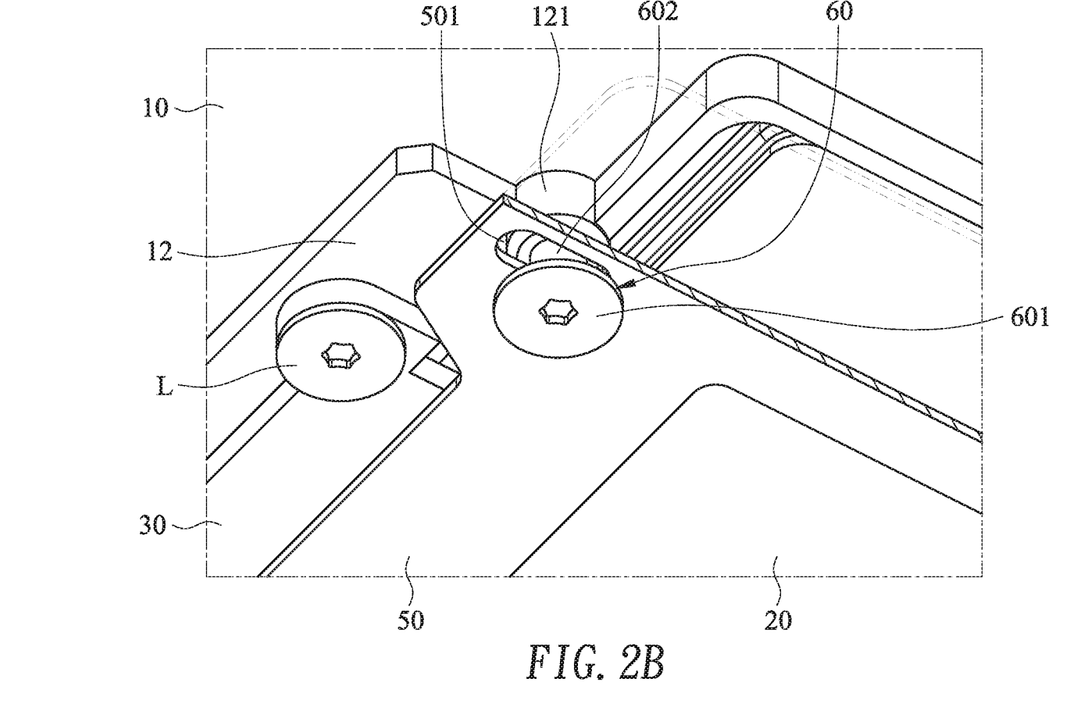
FIG. 2B is a schematic enlarged view of the portion A as shown in FIG. 2A.

Please refer to FIGS. 2A and 2B. FIG. 2A is a schematic bottom view illustrating the touch module according to the embodiment of the present invention. FIG. 2B is a schematic enlarged view of the portion A as shown in FIG. 2A.

As shown in FIG. 2A, the touchpad 20, the connection seat 40 and the supporting plate 50 are collaboratively formed as a touch structure TS. A first side of the circuit board 21 is located near the connection seat 40. A second side of the circuit board 21 is located away from the connection seat 40. The pressing switch 211 is disposed on the bottom surface of the circuit board 21 and located beside the second side of the circuit board 21. Moreover, the pressing switch 211 is located over the pressing block 502. The mode-adjusting switch 212 is disposed on the bottom surface of the circuit board 12 and located beside the first installation part 12. The operation parts 242 of the switching element 24 are partially exposed outside the corresponding switching perforations 112. As the operation parts 242 of the switching element 24 are moved by the user, the touch structure TS is correspondingly moved. That is, the touch structure TS is moved along the length directions of the elongated slots 501 of the supporting plate 50.

In the above embodiment, the touch structure TS is moved with the switching element 24. It is noted that numerous modifications and alterations may be made while retaining the teachings of the invention. For example, in another embodiment, the switching element 24 is installed on the connection seat 40 or the supporting plate 50. Alternatively, the switching element 24 is omitted. Under this circumstance, as the covering plate 23 exposed to the opening 111 (see FIG. 1A) is pushed by the user, the touch structure TS is correspondingly moved.

The stopping pin 30 is fixed between the two protrusion posts 121 of the first installation part 12.

As shown in FIG. 2B, the position-limiting element 60 comprises a head part 601 and a body part 602. The body part 602 is connected with the head part 601. The end of the body part 602 away from the head part 601 is penetrated through the corresponding elongated slot 501 and tightened into the corresponding second fastening hole 1211 (see FIG. 1A). Consequently, the position-limiting element 60 is connected with the corresponding protrusion post 121. The elongated slot 501 is sheathed around the body part 602. The supporting plate 50 is contacted with the head part 601. Consequently, the supporting plate 50 is movable along the length direction of the elongated slot 501.

Figure 3:
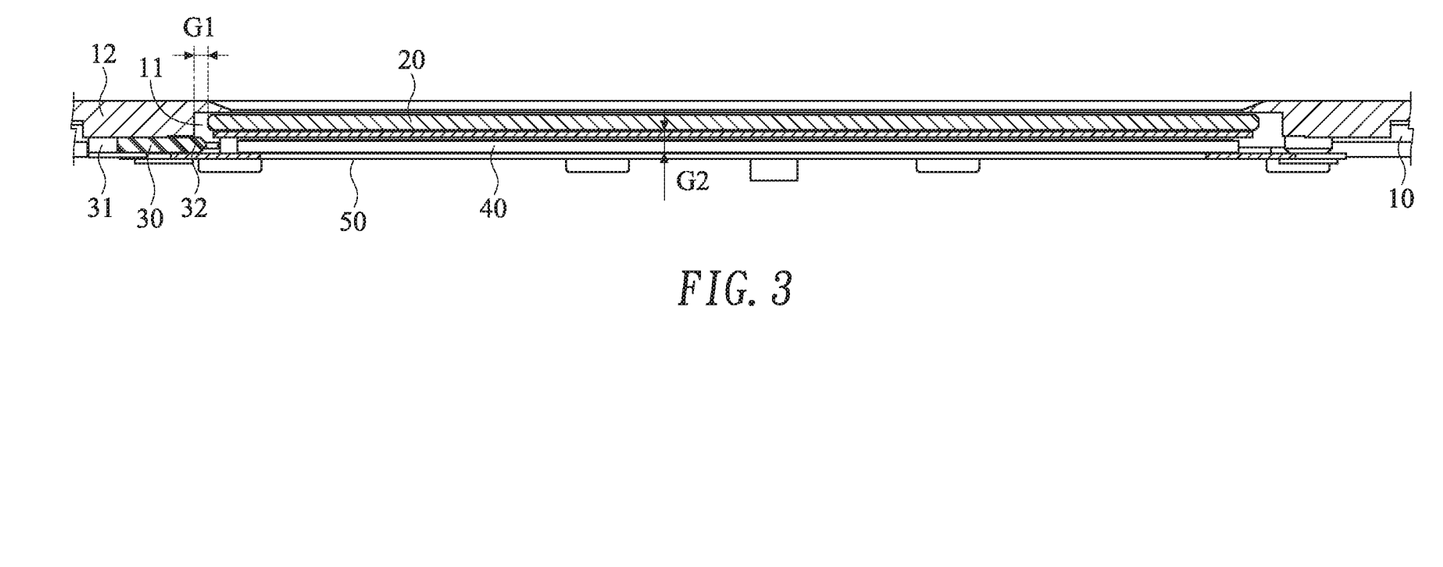
FIG. 3 is a schematic cross-sectional view illustrating the touch module according to the embodiment of the present invention.

Please refer to FIG. 3. FIG. 3 is a schematic cross-sectional view illustrating the touch module according to the embodiment of the present invention. As shown in FIG. 3, the orthographic projection area of the touchpad 20 is smaller than the orthographic projection area of the accommodation structure 11. Consequently, there is a horizontal gap G1 between a lateral edge of the touchpad 20 and an inner wall of the accommodation structure 11. Moreover, there is a vertical gap G2 between the touchpad 20 and the supporting plate 50 through the connection seat 40. Moreover, the second end part 32 of the stopping pin 30 is aligned with the vertical gap G2.

Figure 4A:
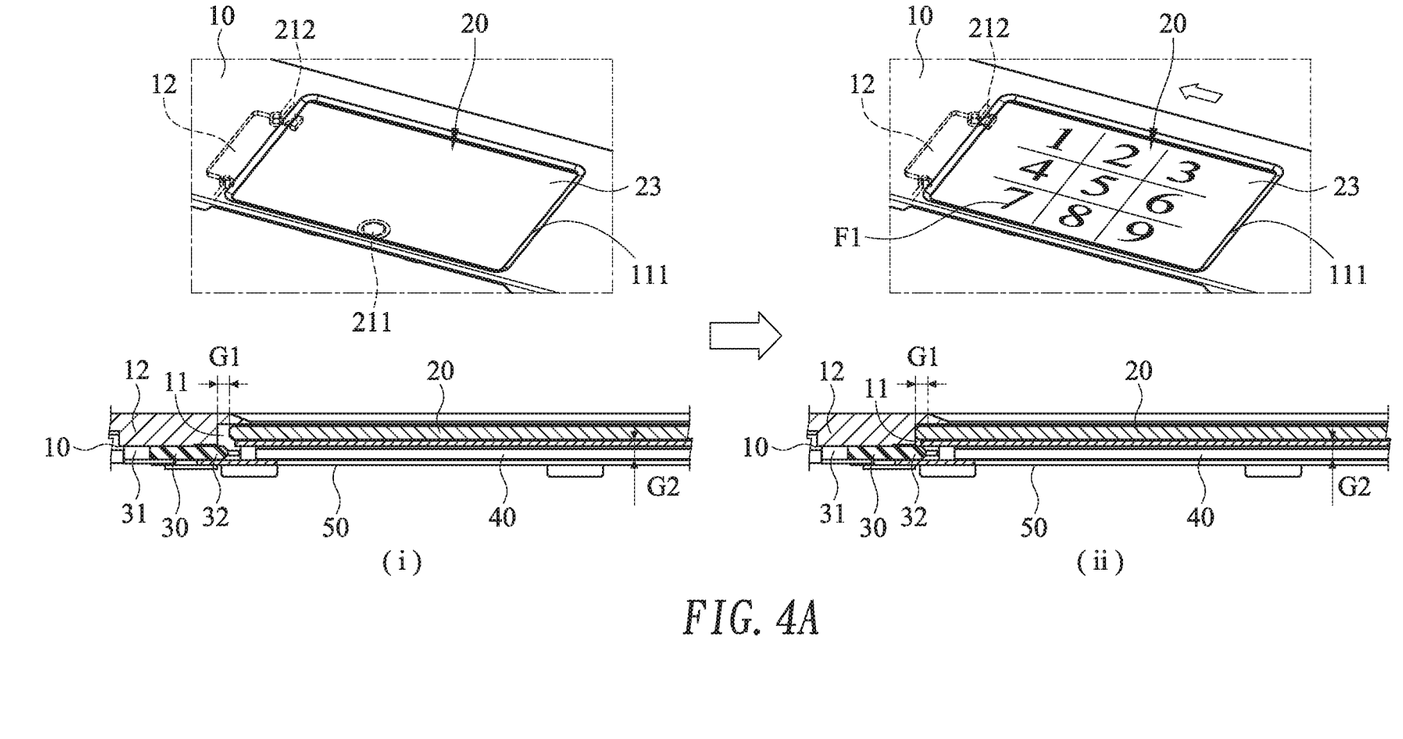
FIG. 4A schematically illustrates the operations of the touch module according to the first embodiment of the present invention.

Please refer to FIGS. 2A and 4A. FIG. 4A schematically illustrates the operations of the touch module according to the first embodiment of the present invention. In the situation (i) of FIG. 4A, the second end part 32 of the stopping pin 30 is not inserted into the vertical gap G2 between the touchpad 20 and the supporting plate 50. Meanwhile, the stopping pin 30 and the touchpad 20 do not interfere with each other. While the touchpad 20 is pressed by the user, the touchpad 20 is swung in the vertical gap G2 by using the connection seat 40 as a fulcrum. Consequently, the pressing switch 211 is contacted with the pressing block 502 of the supporting plate 50 to generate a corresponding pressing signal.

In the situation (ii) of FIG. 4A, the switching element 24 or the covering plate 23 exposed to the opening 111 is moved, and the touch structure TS is correspondingly moved to the left. Meanwhile, the second end part 32 of the stopping pin 30 is inserted into the vertical gap G2 between the touchpad 20 and the supporting plate 50. Since the stopping pin 30 and the touchpad 20 interfere with each other, the touchpad 20 cannot be swung in the vertical gap G2. At the same time, the mode-switching element 212 is pressed by the first installation part 12. Since the mode-adjusting switch 212 is triggered, a corresponding function mode interface F1 is shown on the covering plate 23. For example, the function mode interface F1 is a numeric function mode interface. Under this circumstance, the touchpad 20 may be used as a calculator. Moreover, the design of the present invention is capable of preventing from the problem of erroneously switching or pressing the function mode interface. For example, since the mode-adjusting switch 212 is disposed on the bottom surface of the touchpad 20, the mode-adjusting switch 212 will not be touched by the user directly. Consequently, the problem of erroneously triggering the mode-adjusting switch 212 is avoided. Moreover, when the touchpad 20 is stopped by the stopping pin 30, the touchpad 20 cannot be swung. Consequently, when the numeric function mode interface F1 is operated by the user, the pressing action on the touchpad 20 will not erroneously trigger the pressing switch 211 and the erroneous pressing signal will not be generated.

Figure 4B:
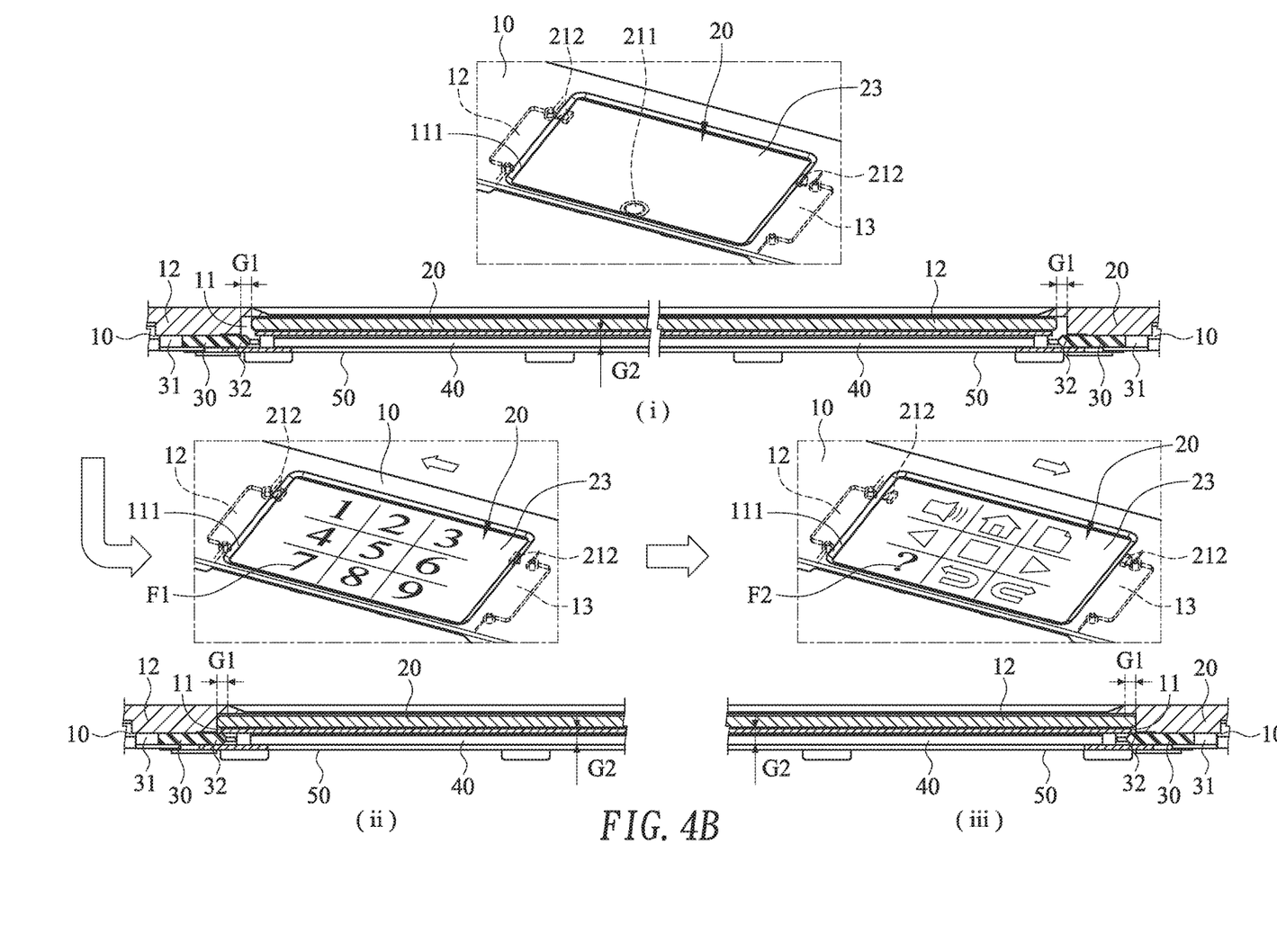
FIG. 4B schematically illustrates the operations of a touch module according to a second embodiment of the present invention.

Please refer to FIG. 4B. FIG. 4B schematically illustrates the operations of a touch module according to a second embodiment of the present invention. The components and functions of the touch module in the situation (i) of FIG. 4B are similar to those of the in the situation (i) of FIG. 4A except for the numbers of the horizontal gaps G1 and the number of the mode-adjusting switches 212. In this embodiment, there is a horizontal gap G1 between a first lateral edge of the touchpad 20 and the inner wall of the accommodation structure 11 and there is another horizontal gap G1 between a second lateral edge of the touchpad 20 and the inner wall of the accommodation structure 11. Moreover, two mode-adjusting switches 212 are disposed on the bottom surface of the touchpad 20 and located at two opposite sides.

In the situation (ii) of FIG. 4B, the switching element 24 or the covering plate 23 exposed to the opening 111 is moved, and the touch structure TS is correspondingly moved to the left. Meanwhile, the second end part 32 of the left stopping pin 30 is inserted into the vertical gap G2 between the touchpad 20 and the supporting plate 50. Since the left stopping pin 30 and the touchpad 20 interfere with each other, the touchpad 20 cannot be swung in the vertical gap G2. At the same time, the left mode-switching element 212 is pressed by the first installation part 12. Since the left mode-adjusting switch 212 is triggered, a corresponding function mode interface F1 (e.g., a numeric function mode interface) is shown on the covering plate 23.

In the situation (iii) of FIG. 4B, the switching element 24 or the covering plate 23 exposed to the opening 111 is moved, and the touch structure TS is correspondingly moved to the right. Meanwhile, the second end part 32 of the right stopping pin 30 is inserted into the vertical gap G2 between the touchpad 20 and the supporting plate 50. Since the right stopping pin 30 and the touchpad 20 interfere with each other, the touchpad 20 cannot be swung in the vertical gap G2. At the same time, the right mode-switching element 212 is pressed by the second installation part 13. Since the right mode-adjusting switch 212 is triggered, a corresponding function mode interface F2 (e.g., a quick mode interface) is shown on the covering plate 23.

In comparison with the conventional technologies, the touch module of the present invention is capable of quickly switching the function mode interface through the movement of the touch structure. Consequently, the problem of erroneously switching the function mode is avoided. In other words, the technology of the present invention is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A touch module for an electronic device, the touch module comprising:
    a casing comprising an accommodation structure, wherein the accommodation structure is formed on a bottom surface of the casing, and the accommodation structure comprises an opening;
    a touch structure comprising a touchpad, a supporting plate, a connection seat, a first installation part, and a second installation part, wherein the touchpad is installed in the accommodation structure with a horizontal gap between a lateral edge of the touchpad and an inner wall of the accommodation structure, the supporting plate including at least one elongated slot and is movably installed on the bottom surface of the casing, the connection seat is arranged between the touchpad and the supporting plate, the touchpad and the supporting plate are combined together through the connection seat with a vertical gap between the touchpad and the supporting plate through the connection seat, the first installation part is installed on a first lateral wall of the accommodation structure corresponding to the horizontal gap, the second installation part is installed on a second lateral wall of the accommodation structure, the first installation part comprises two first protrusion posts, and the second installation part comprises two second protrusion posts, the at least one elongated slot aligned with the first and second protrusion posts;
    a pressing switch, disposed on a bottom surface of the touchpad, and the pressing switch is located beside a side of the touchpad away from the connection seat;
    at least one mode-adjusting switch, wherein the at least one mode-adjusting switch is disposed on the bottom surface of the touchpad and located beside the first installation part; and
    at least one stopping pin, wherein each of the at least one stopping pin comprises a first end part and a second end part, which are opposed to each other, wherein the first end part is fixed on the bottom surf ace of the casing, and the second end part is aligned with the vertical gap;
    wherein while the touch structure is moved in a first direction or a second direction through the at least one horizontal gap, the second end part of the stopping pin is inserted into the vertical gap or detached from the vertical gap, wherein the first direction and the second direction are opposite;
    wherein when the second end part of the stopping pin is detached from the vertical gap, the touchpad is permitted to be swung in the vertical gap by using the connection seat as a fulcrum;
    wherein when the touchpad is swung and the pressing switch is contacted with the supporting plate, a corresponding pressing signal is generated; and
    wherein when the second end part of the stopping pin is inserted into the vertical gap, the at least one mode-switching element is pressed by the first installation part to enable at least one function mode interface, and the touchpad is stopped by the stopping pin and cannot be swung to trigger the pressing switch.

2. The touch module according to claim 1, wherein a first edge of the supporting plate comprises two first of the at least one elongated slots corresponding to the two first protrusion posts, and a second edge of the supporting plate comprises two second of the at least one elongated slots corresponding to the two second protrusion posts.

3. The touch module according to claim 2, wherein the touch module further comprises four position-limiting elements, wherein after the four position-limiting elements are respectively penetrated through the corresponding first elongated slots and the corresponding second elongated slots and connected with the corresponding first protrusion posts and the corresponding second protrusion posts, the supporting plate is movable along length directions of the first elongated slots and the second elongated slots.

4. The touch module according to claim 3, wherein each of the position-limiting elements comprises a head part and a body part, wherein an end of the body part away from the head part is penetrated through the corresponding elongated slot of the first elongated slots and the second elongated slots and connected with the corresponding protrusion post of the first protrusion posts and the second protrusion posts, and the supporting plate is contacted with the head part.

5. The touch module according to claim 1, wherein the first end part of the at least one stopping pin is fixed between the two first protrusion posts of the first installation part, and the second end part of the at least one stopping pin is located under the at least one horizontal gap.

6. The touch module according to claim 1, wherein the at least one function mode interface includes a numeric function mode interface or a quick function mode interface.

7. The touch module according to claim 1, wherein the touchpad comprises a covering plate, a backlight display layer and a circuit board, which are arranged in a stack form from top to bottom, wherein the covering plate is partially exposed to the opening, and the backlight display layer is permitted to display the at least one function mode interface on a surface of the covering plate.

8. The touch module according to claim 1, wherein the supporting plate comprises a pressing block corresponding to the pressing switch.

9. The touch module according to claim 1, wherein the accommodation structure further comprises at least one switching perforation, and the at least one switching perforation is located at a lateral wall of the accommodation structure and arranged near an edge of the casing.

10. The touch module according to claim 9, wherein the touch structure further comprises a switching element, and the switching element comprises a fixed part and at least one operation part, wherein the at least one operation part is connected with the fixed part, the fixed part is fixed on a bottom surface of the touchpad, and the at least one operation part is partially exposed outside the at least one switching perforation.

11. The touch module according to claim 10, wherein while the touchpad is moved with the at least one operation part, the touchpad is moved within the accommodation structure through the at least one horizontal gap.

12. The touch module according to claim 1, wherein the electronic device is a notebook computer, a keyboard, a smart phone, a personal digital assistant, a writing tablet or a graphics tablet.

* * * * *